United States Patent [19]
Okada

[11] Patent Number: 5,626,779
[45] Date of Patent: May 6, 1997

[54] MICROMACHINE TRANSDUCER WITH CANTILEVERED MOVABLE PORTION

[75] Inventor: Hiroyuki Okada, Tokyo, Japan

[73] Assignee: NEC Corporation, Tokyo, Japan

[21] Appl. No.: 250,829

[22] Filed: May 31, 1994

[30] Foreign Application Priority Data

Jun. 7, 1993 [JP] Japan ................... 5-135507

[51] Int. Cl.⁶ .................. H05B 3/00; G01L 1/22
[52] U.S. Cl. .................. 219/201; 73/514.23; 73/514.37; 73/862.474; 73/862.639; 338/42
[58] Field of Search .................. 219/200–201; 338/2, 4, 6, 36, 47, 42; 83/15–16, 170; 29/621.1; 73/862.474, 862.627, 862.634, 862.639, 514.21–514.24, 514.33, 514.36, 514.38, 514.37

[56] References Cited

U.S. PATENT DOCUMENTS

| | | | |
|---|---|---|---|
| 4,670,092 | 6/1987 | Motamedi | 156/643.1 |
| 4,841,272 | 6/1989 | Yamagishi et al. | 338/2 |
| 4,922,756 | 5/1990 | Henrion | 73/514.24 |
| 4,974,596 | 12/1990 | Frank | 128/672 |
| 4,987,781 | 1/1991 | Reimann | 73/514.33 |
| 5,060,504 | 10/1991 | White et al. | 73/514.33 |
| 5,186,053 | 2/1993 | Egley et al. | 73/514.36 |
| 5,251,485 | 10/1993 | Kondo | 73/514.16 |

FOREIGN PATENT DOCUMENTS 3-002569  1/1991  Japan ................... 73/514.36

OTHER PUBLICATIONS

Japanese Unexamined Patent Public Disclosure No. 62-190748 filed Feb. 17, 1986, and laid open on Aug. 20, 1987.

*Primary Examiner*—Teresa J. Walberg
*Assistant Examiner*—Raphael Valencia
*Attorney, Agent, or Firm*—Burns, Doane, Swecker & Mathis, LLP

[57] ABSTRACT

The micromachine includes a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion. The support member is formed of weaker material than material of which all of the portions are formed, with respect to any one of properties which all of the portions have. Thus, only the support member can be cut off by applying energy effective to the one of properties thereto after the micromachine has been packaged.

10 Claims, 8 Drawing Sheets

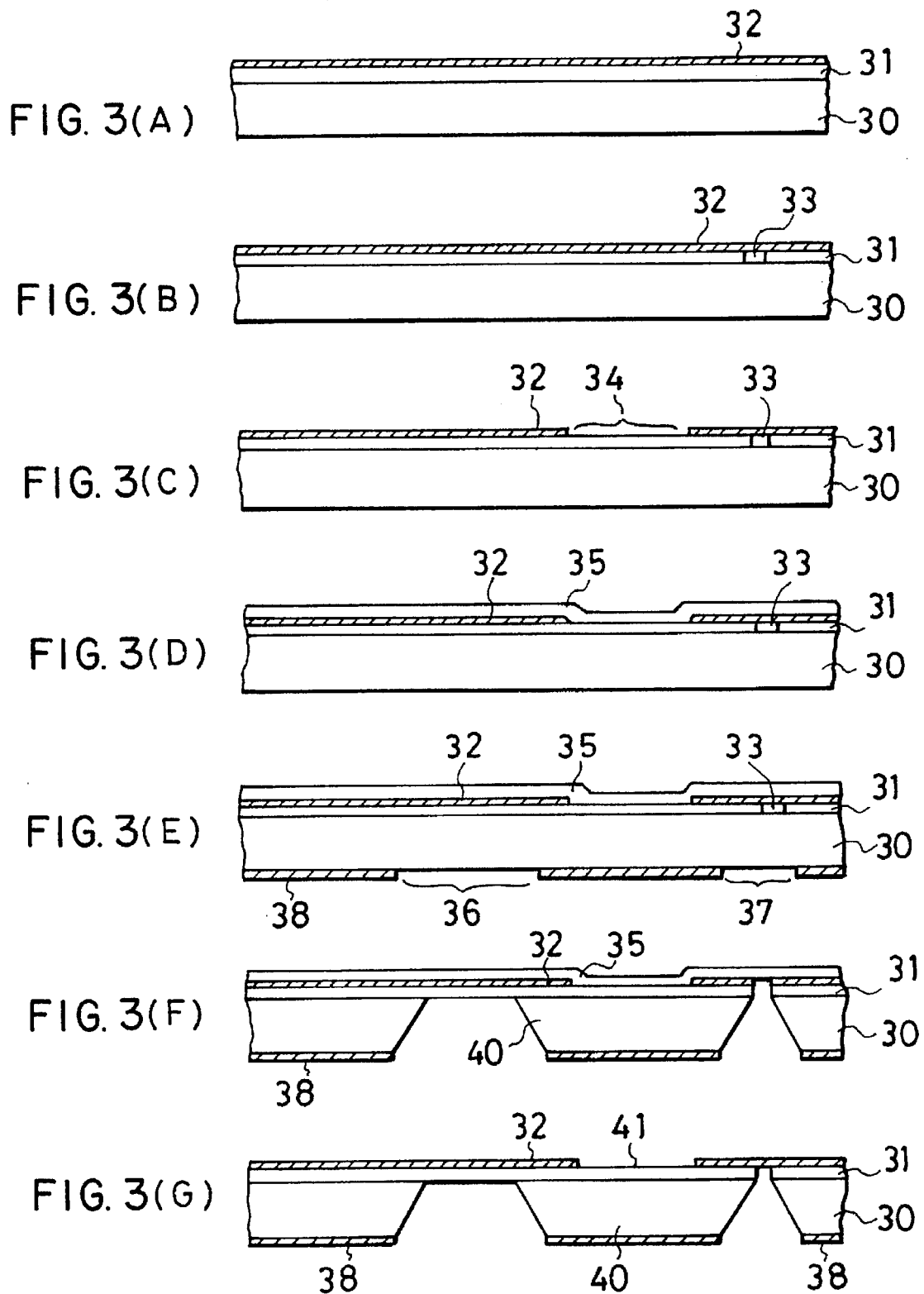

MICROMACHINE TRANSDUCER WITH CANTILEVERED MOVABLE PORTION

BACKGROUND OF THE INVENTION

1. Field of the Invention

The invention relates to a micromachine, and more particularly to a micromachine suitable for use with a microactuator for transmitting minute pressure or with a microsensor for detecting minute flow, pressure and acceleration. The invention also relates to a method of fabricating such a micromachine.

2. Description of the Prior Art

In general, a micromachine is fabricated in a form in which a plurality of minute elements are integrally assembled by virtue of semiconductor processing technique. However, since the elements are quite minute and further connections for connecting the elements to each other are relatively weak, the connections are likely to be broken due to impulsive impacts occurring during a semiconductor fabricating process, causing a low productivity.

FIGS. 1A and 1B illustrate a conventional micromachine used as a sensor. FIG. 1A is a top plan view and FIG. 1B is a cross-sectional view taken along the line A—A in FIG. 1A. Japanese Unexamined Patent Public Disclosure No. 62-190748, filed on Feb. 17, 1986 and laid open on Aug. 20, 1987, has suggested an improvement of a micromachine for enhancing the productivity. In the Disclosure, a micromachine is applied to an acceleration sensor as a typical example of a micromachine. As illustrated in FIGS. 1A and 1B, a movable portion 11, an unmovable portion 12 and a connecting portion 10 for connecting the movable portion 11 to the unmovable portion 12 are formed from a single silicon semiconductor substrate by means of a etching process. A thin film 13 are temporarily bridged over the movable portion 11 and the unmovable portion 12 for decreasing a load acting on the connecting portion 10. The thin film 13 is made of silicon by a chemical vapor deposition (CVD) process in order not to give an additional load to the micromachine. After the micromachine has been packaged, a laser beam is irradiated from outside of the package to the thin film 13 to thereby cut the thin film 13 off. Thus, the acceleration sensor is completed.

As is known in the art, the acceleration operates as follows. When an acceleration acts on the movable portion 11 in the direction indicated by an arrow X in FIG. 1B, the movable portion 11 displaces along the direction X. A piezoresistance 14 is disposed on the connecting portion 10. With the displacement of the movable portion 11, the piezoresisrance 14 is distorted accordingly. With the distortion of the piezoresistance 14, an electrical resistance of the piezoresistance 14 is also varied. The acceleration acting on the micromachine can be detected by detecting the variation of the electrical resistance of the piezoresistance 14.

The above explained process of the Disclosure may work well until the sensor is installed in a package. However, if oscillations occurring during a packaging step involve a frequency almost equal to a characteristic frequency of the connecting portion 10 and/or the thin film 13, the connecting portion 10 and/or the thin film 13 are(is) likely to be cut off by such oscillations. In particular, the productivity of the micromachine has recently been decreased because of the breakage of the connecting portion 10 caused by an increased weight of the movable portion 11 and/or an extension of the connecting portion 10 both aiming an improvement of the sensitivity of the acceleration sensor. In addition, a package has to be provided with a window through which a laser beam can pass, and it is quite necessary to dispose nothing in a path along which a laser beam travel to the thin film 13. These limits an arrangement of a package. Furthermore, when a laser beam is intended to be used for cutting the thin film off, a sequence step has to be accompanied for positioning a packaged micromachine. For instance, another laser beam has to be irradiated for positioning a packaged micromachine. Thus, it is difficult to mass-produce acceleration sensors one at a time unlike a batch type process.

SUMMARY OF THE INVENTION

It is an object of the present invention to provide a micromachine in which no specific package structure is required and further a connecting portion for connecting a movable portion to an unmovable portion is unlikely to be broken, with result of a high productivity and a possibility of mass production of micromachines.

The invention provides a micromachine including a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion. The support member is formed of weaker material than material of which all of the portions are formed, with respect to any one of properties which all of the portions have. Thus, the support member can be cut off by applying energy effective to the one of properties thereto after the micromachine has been packaged.

The invention also provides a micromachine including a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion. The support member is formed of thermally fusible material which generates heat therein when an electrical current is applied thereto due to a resistance thereof. Thus, the support member is cut off by applying an electrical current thereto.

In a preferred embodiment, at least the connecting portion among all of the portions has electrically conductive diffusion layer formed by injecting impurities thereinto.

In another preferred embodiment, all of the portions are provided with metal wirings formed by means of metal deposition process.

In still another preferred embodiment, all of the portions have electrically conductive diffusion layer formed by injecting impurities thereinto or are provided with metal wirings formed by means of a metal deposition process in dependence on the order of steps involved in a process for fabricating the micromachine.

The invention further provides a micromachine including a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion. The support member is formed of material having a lower melting point than a melting point of material of which all of the portions are formed, whereby the support member is cut off by applying heat thereto.

In a preferred embodiment, all of the portions are made of silicon, and the support member is constituted of plastic adhesive.

The invention further provides a micromachine includes a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion. The support member has a characteristic frequency different from that of all of the portions, whereby the support member can be cut off by applying the characteristic frequency of the support member thereto.

In a preferred embodiment, all of the portions are made of silicon, and the support member is made of carbon.

The micromachine in accordance with the invention is most suitable for use with an acceleration sensor.

The invention also provides a method of manufacturing a micromachine having the steps of providing a micromachine, the micromachine having a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion, the support member being formed of weaker material than material of which all of the portions are formed, with respect to any one of properties which all of the portions have, packaging the micromachine, and applying energy effective to the one of properties to the micromachine. Thus, only the support member is cut off in the micromachine.

The invention further provides a method of manufacturing a micromachine having the steps of providing a micromachine, the micromachine having a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion, the support member being formed of thermally fusible material, the material generating heat therein when an electrical current is applied thereto due to a resistance thereof, packaging the micromachine, and applying an electrical current to the support member, whereby only the support member is cut off in the micromachine.

The invention further provides a method of manufacturing a micromachine having the steps of providing a micromachine, the micromachine having a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion, the support member being formed of material having a lower melting point than a melting point of material of which all of the portions are formed, packaging the micromachine, and applying heat to the micromachine to the micromachine, whereby only the support member is cut off in the micromachine.

The invention further provides a method of manufacturing a micromachine having the steps of providing a micromachine, the micromachine having a movable portion, an unmovable portion surrounding the movable portion, a connecting portion for connecting the movable portion with the unmovable portion in a cantilever fashion, and a support member for connecting the movable portion with the unmovable portion at a location other than a location at which the movable portion is connected with the unmovable portion through the connecting portion, the support member having a characteristic frequency different from that of all of the portions, packaging the micromachine, and applying the characteristic frequency of the support member to the micromachine, whereby only the support member is cut off in the micromachine.

The advantages obtained by the aforementioned present invention will be described hereinbelow.

In the invention, the thin film for bridging the movable portion to the unmovable portion is made of a weaker material than a material of which all of the movable portion, the unmovable portion and the connecting portion are made, with respect to any one of properties such as an electrical resistance, melting point and characteristic frequency which all the portions have. After the micromachine has been packaged, an energy effective to the one of properties is applied to the thin film. For instance, when an electrical current has been selected as the above mentioned property, an electrical current is applied to the thin film. As an alternative thereto, when a characteristic frequency has been selected, a characteristic frequency inherent to the thin film is applied to the thin film. Thus, the thin film can be broken. In the invention, it is not necessary to provide any specific structure with a package, and in addition, it is possible to avoid the connecting portion from being cut off during a micromachine fabricating process. This results in a high productivity of a micromachine. Furthermore, it is possible to apply energy such as heat, an electrical current and oscillation energy for cutting the thin film off to a lot of micromachines at a time, enabling to choose a batch type process suitable for mass production of micromachines.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 illustrates steps for fabricating an acceleration sensor.

DESCRIPTION OF THE PREFERRED EMBODIMENTS

A preferred embodiment in accordance with the invention will be explained hereinbelow with reference to drawings.

Figure 1A:
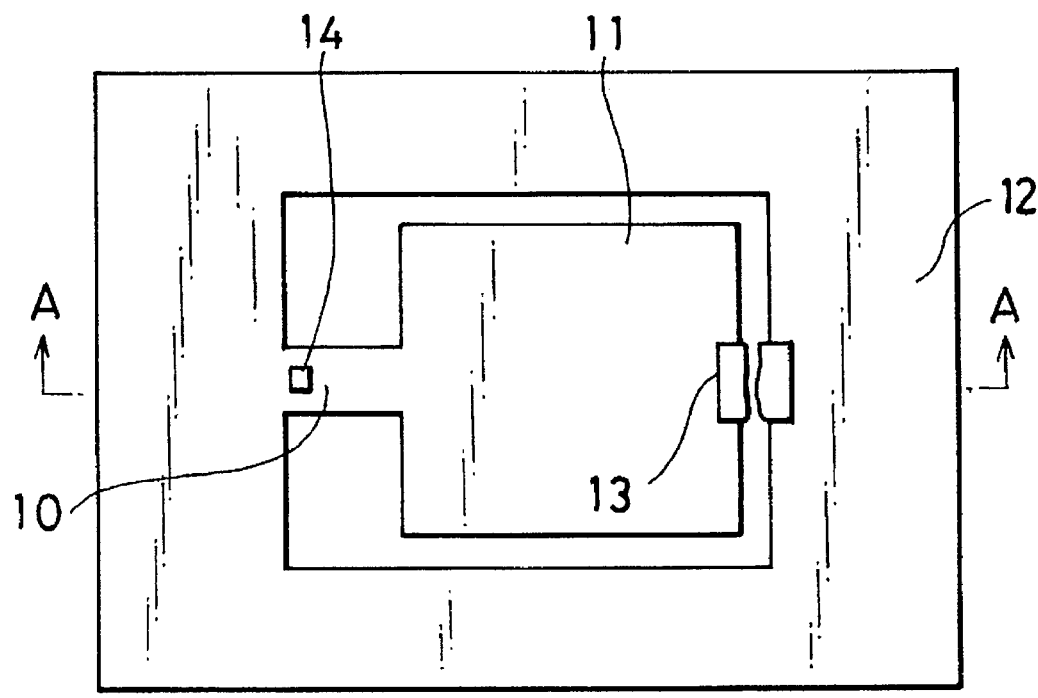
FIG. 1A is a top plan view illustrating a conventional acceleration sensor.
Figure 1B:
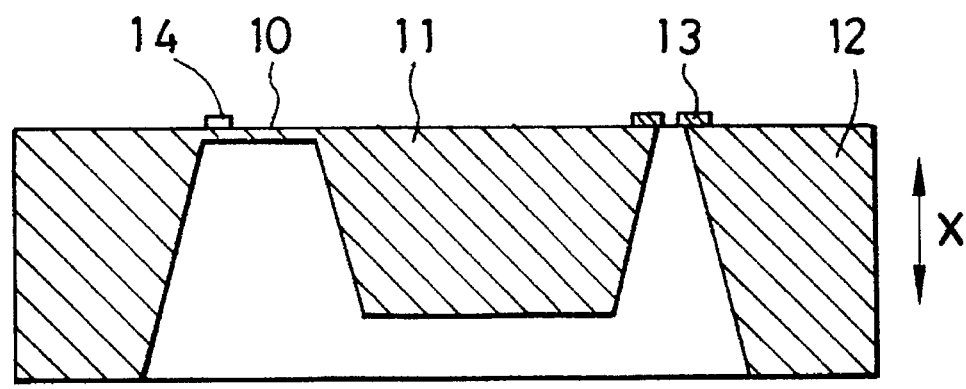
FIG. 1B is a cross-sectional view taken along the line A—A in FIG. 1A.
Figure 2A:
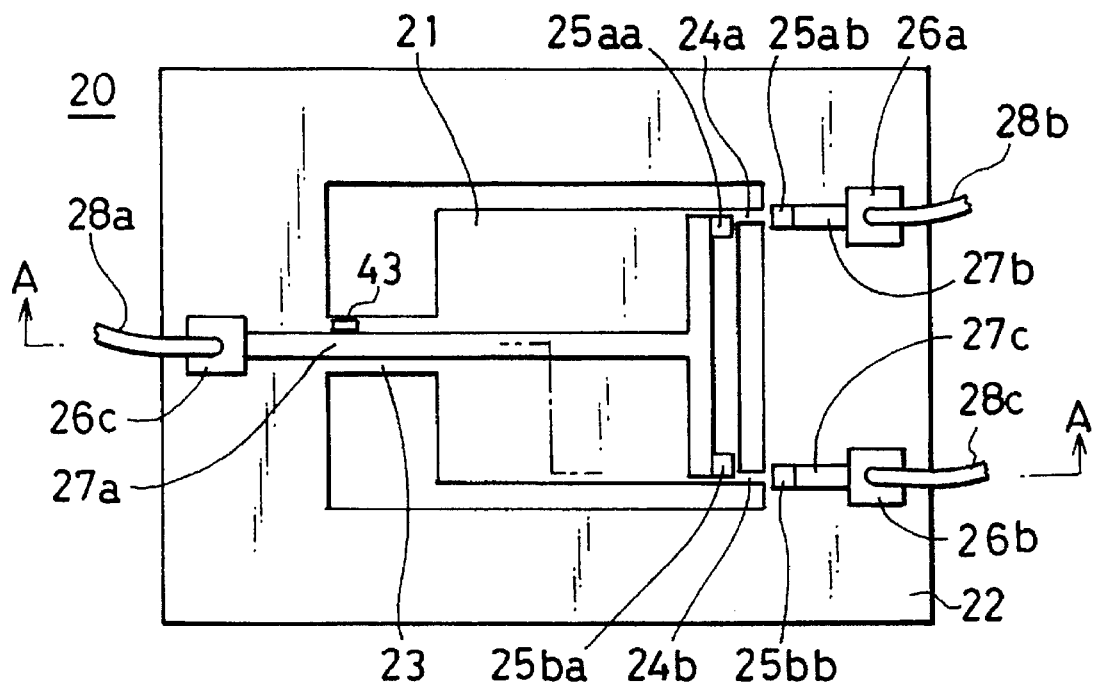
FIG. 2A is a top plan view illustrating a first embodiment of an acceleration sensor in accordance with the invention.
Figure 2B:
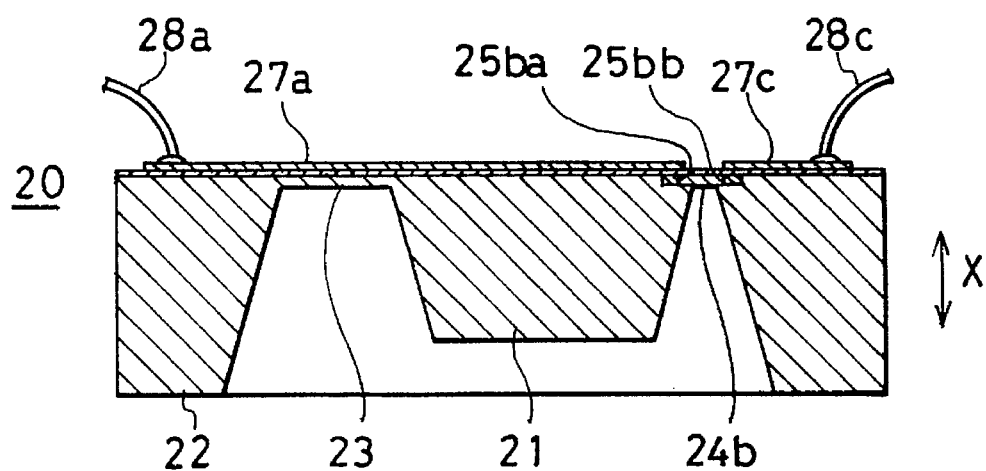
FIG. 2B is a cross-sectional view taken along the line A—A in FIG. 2A.

FIGS. 2A and 2B illustrate a first embodiment of a micromachine in accordance with the invention, in which the micromachine is applied to an acceleration sensor. A micromachine 20 has a movable portion 21 for vertical movement along a direction indicated by X in FIG. 2B, an unmovable or fixed portion 22 surrounding the movable portion 21, and a connecting portion 23 for connecting the movable portion 21 to the unmovable portion 22. As illustrated in FIG. 2A, the movable portion 21 is supported by the connecting portion in a cantilever fashion. The micromachine 20 further includes a pair of support members 24a, 24b for the connecting movable portion 21 to the unmovable portion 22 at a location other than a location at which the movable portion 21 is connected to the unmovable portion 22 through the connecting portion 23. More specifically, the pair of support members 24a, 24b are disposed at opposite side of the connecting portion 23 with respect to the movable portion The support members 24a, 24b are formed with an electrically conductive diffusion layer by injecting impurities thereinto such as phosphorus (P) and boron (B) so that the support members 24a and 24b have higher resistance than all of others. On the opposite sides of the pair of support members 24a and 24b are disposed a pair of contacts 25aa, 25ab and 25ba, 25bb respectively. On the unmovable portion 22 at the longitudinally Opposite sides are disposed bonding pads 26a, 26b, 26c.

The bonding pad 26c is electrically connected to both the contacts 25aa and 25ba through an electrical wire 27a. The contacts 25ab and 25bb are electrically connected to the bonding pads 26a and 26b through electrical wires 27b and 27c respectively. To the bonding pads 26a, 26b, 26c are connected wires 28a, 28b, 28c respectively through which an electrical current is supplied. Specifically, an electrical current passes through the wire 28a, the bonding pad 26c, the wire 27a, the contacts 25aa and 25ba, the support members 24a and 24b, the contacts 25ab and 25bb, the wires 27b and 27c, and the bonding pads 26a and 26b. It should be noted that the support members 24a and 24b are formed therein with an electrically conductive layer, and hence an electrical current can pass therethrough.

On the connecting portion 23 is disposed a piezoresistance 43 for detecting a displacement of the movable portion 21.

Hereinbelow, there will be explained in brief how a micromachine is fabricated with reference to FIG. 3.

First, as illustrated in FIG. 3(A), on a P-type silicon substrate 30 is deposited an N-type silicon layer 31, and then on the silicon layer 31 is further deposited a silicon oxide ($SiO_2$) layer 32 as an insulation layer.

Then, as illustrated in FIG. 3(B), a P-type diffusion layer 33 is formed in the N-type silicon layer 31 to determine a shape of a cantilever 41 (see FIG. 3(G)).

Then, as illustrated in FIG. 3(C), a contact area 34 is formed for the silicon layer 31, and both the insulation layer 16 and the contact area 34 is entirely covered with an electrode layer 35 as illustrated in FIG. 3(D).

Then, as illustrated in FIG. 3(E), on the bottom surface of the P-type silicon substrate 30 is formed an etching mask layer 38 having non-mask areas 24 and 26 in which the etching mask layer 38 is not present. An electrical current is applied to the electrode layer 35 with the material being immersed in etching fluid. Thus, an electrochemical etching process is carried out.

By carrying out an electrochemical etching process, a body 40 of the cantilever 41 is formed between the non-mask areas 36 and 37, as illustrated in FIG. 3(F).

Finally, as illustrated in FIG. 3(G), the electrode layer 35 is removed out.

The thus fabricated micromachine is provided with the aforementioned support members 24a and 24b, the contacts 25aa, 25ab, 25ba and 25bb, the bonding pads 26a, 26b and 26c, the wires 27a, 27b and 27c and the wires 28a, 28b and 28c.

Figure 4:
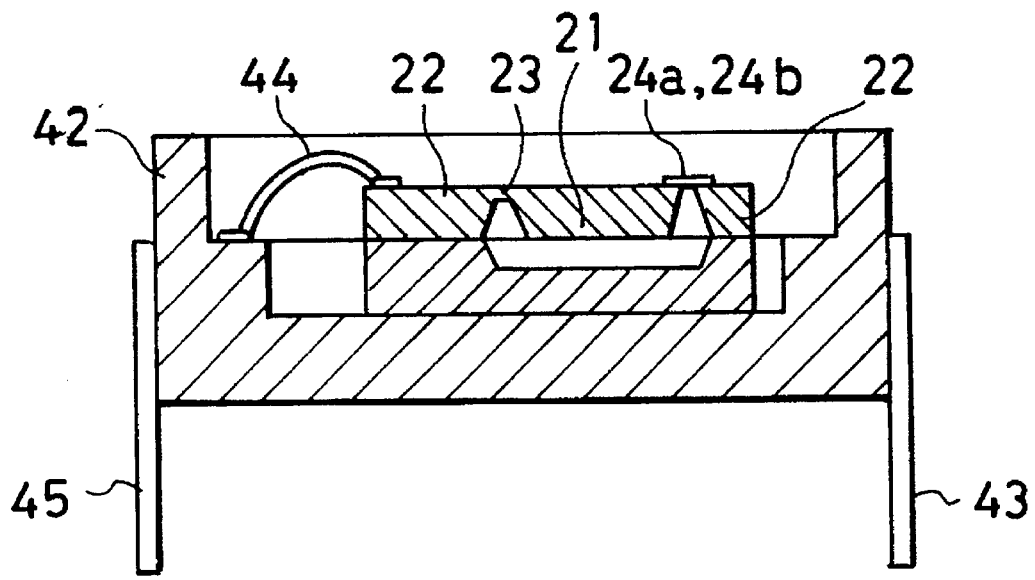
FIG. 4 is a cross-sectional view illustrating an acceleration sensor under the steps of bonding and packaging.

Then, as illustrated in FIG. 4, the acceleration sensor 20 is contained in a package 42 and secured to a bottom surface of the package 42.

The piezoresistance 43 disposed on the connecting portion 23 is electrically connected through a wire 44 to a lead wire 45 formed at the side of the package 42. Thus, a signal representing a displacement of the movable portion 21, emitted from the piezoresistance 43 can be taken out through the lead wire 45.

Figure 5:
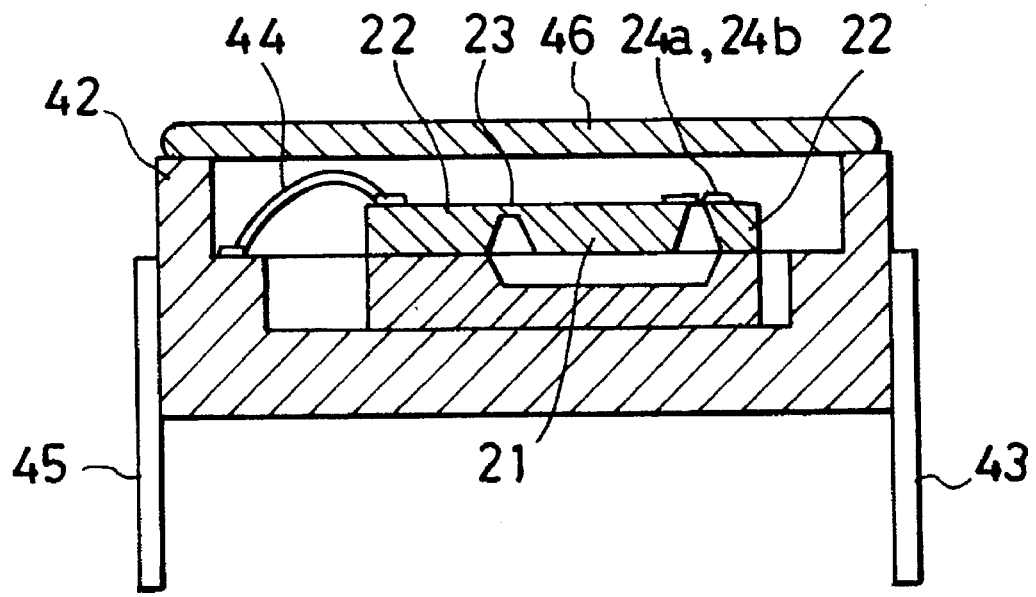
FIG. 5 is a cross-sectional view of a finished micromachine.

Finally, the package 42 is sealed off with a cover 46, as illustrated in FIG. 5. Thus, an acceleration sensor has been packaged, however, the support members 24a and 24b still connects the movable portion 21 to the unmovable portion 22.

After packaging, an electrical current is applied to the support members 24a and 24b through the wire 28a, the bonding pad 26a, the wire 27a, the contacts 25aa, 25ab and 25ba, 25bb, the wires 27b and 27c, the bonding pads 26a and 26b and the wires 28b and 28c. Since the support members 24a and 24b are formed in lower density and hence to have higher resistance than others, only the support members 24a and 24b are heated and hence melted down. Thus, a final product of an acceleration sensor is completed.

This embodiment has advantages that an acceleration sensor can be completed without giving any oscillation thereto and that an electrical current can be concurrently applied to a lot of acceleration sensors disposed in series.

In this embodiment, an electrically conductive diffusion layer is formed for applying an electrical current to the support members 24a and 24b. However, it should be noted that a metal wire formed by a metal vapor deposition process may be used in place of the diffusion layer. One of the formation of the diffusion layer and the metal wire may be selected in dependence on the order of steps involved in a used process for fabricating the micromachine.

Figure 6:
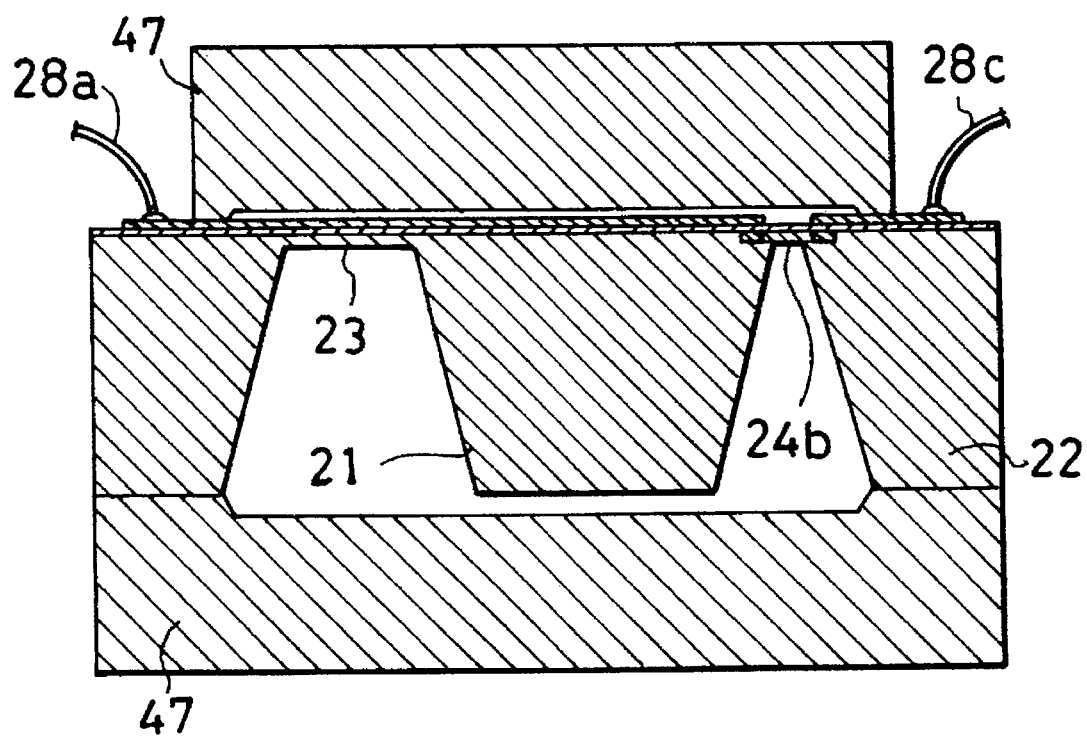
FIG. 6 is a cross-sectional view similar to FIG. 2B, but having caps on both upper and bottom surfaces.

It should be noted that a damping cap 47 as illustrated in FIG. 6 may be used at need to cover the acceleration sensor 20 for wire bonding and/or packaging.

Figure 7A:
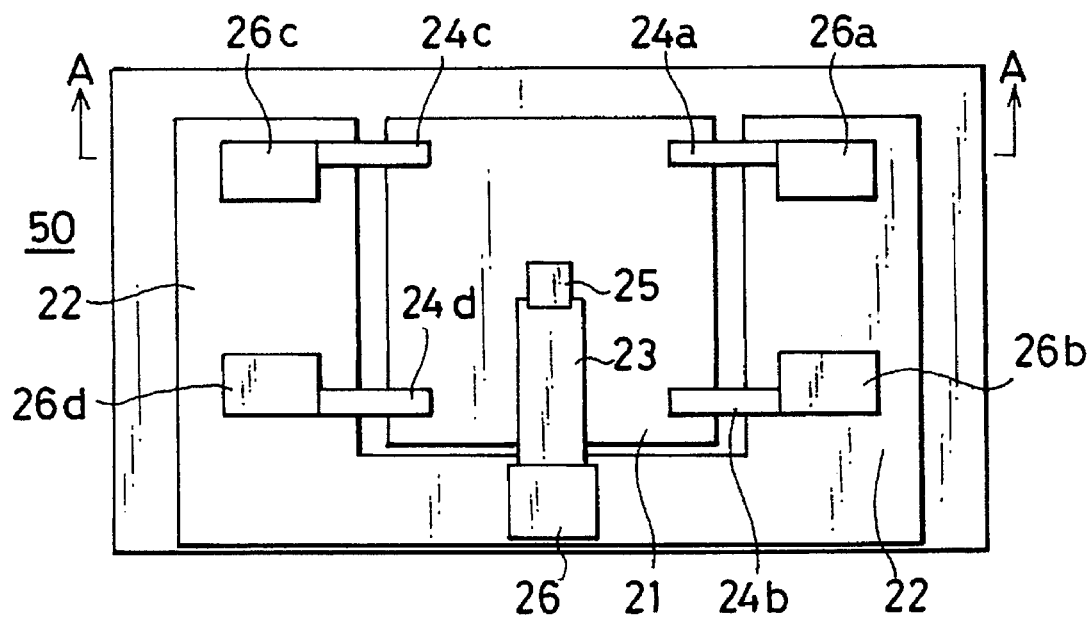
FIG. 7A is a top plan view illustrating another sensor to which the sensor illustrated in FIGS. 1A and 1B is applied.
Figure 7B:
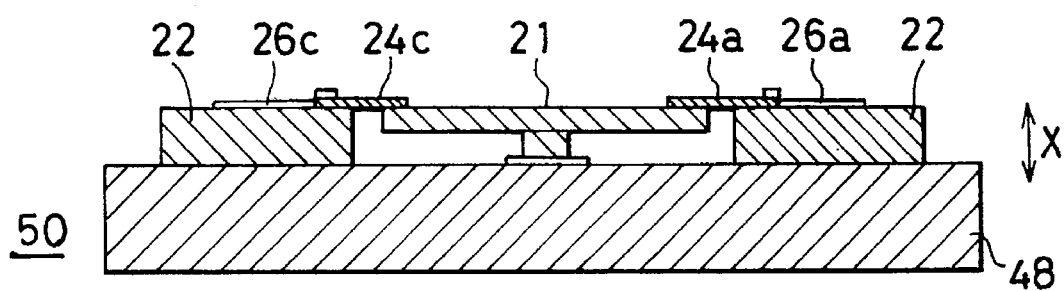
FIG. 7B is a cross-sectional view taken along the line A—A in FIG. 7A.

FIGS. 7A and 7B illustrate another acceleration sensor to which the first embodiment is applied. A micromachine 50 has a movable portion 21 for vertical movement along a direction indicated by X in FIG. 7B, an unmovable or fixed portion 22 surrounding the movable portion 21, and a connecting portion 23 for connecting the movable portion 21 to the unmovable portion 22. The unmovable portion 22 is fixed on a substrate 48. The micromachine 50 further includes four support members 24a, 24b, 24c and 24d for connecting the movable portion 21 to the unmovable portion 22 at a location other than a location at which the movable portion 21 is connected to the unmovable portion 22 through the connecting portion 23. More specifically, the support members 24a, 24b, 24c and 24d are disposed at corners of the movable portion 21, each bridging over the movable portion 21 and the unmovable portion 22.

The support members 24a, 24b, 24c and 24d are formed with material having higher electrical resistance than that of the movable portion 21, the unmovable portion 22 and the connecting portion 23. The support members 24a, 24b, 24c and 24d connected to bonding pads 26a, 26b, 26c and 26d respectively. The connecting portion 23 has at its one end a bonding pad 26 fixed on the unmovable portion 22, and also has at its other end a contact 25 electrically connected to the movable portion 21. It should be noted that the movable portion 21 and the connecting portion 23 are formed of material having an electrical conductivity.

After packaging the acceleration sensor 50 in a package, an electrical current is applied to the acceleration sensor 50 between the bonding pad 26 and the bonding pads 26a, 26b, 26c and 26d. An electrical current travels from the bonding pad 26 through the connecting portion 23, the contact 25, the movable portion 21, the support members 24a–24d and the bonding pads 26a–26d. Since the support members 24a–24d have higher electrical resistance than others, only the support members 24a–24d are heated and hence melted down. Thus, a final product of an acceleration sensor is completed.

Figure 8A:
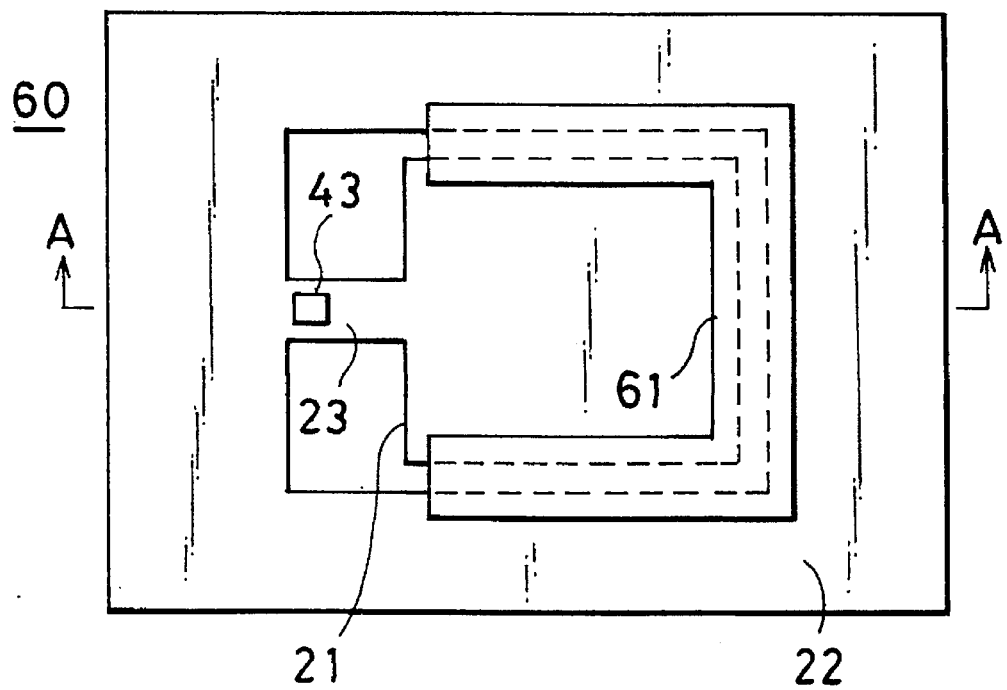
FIG. 8A is a top plan view illustrating a second embodiment in accordance with the invention.
Figure 8B:
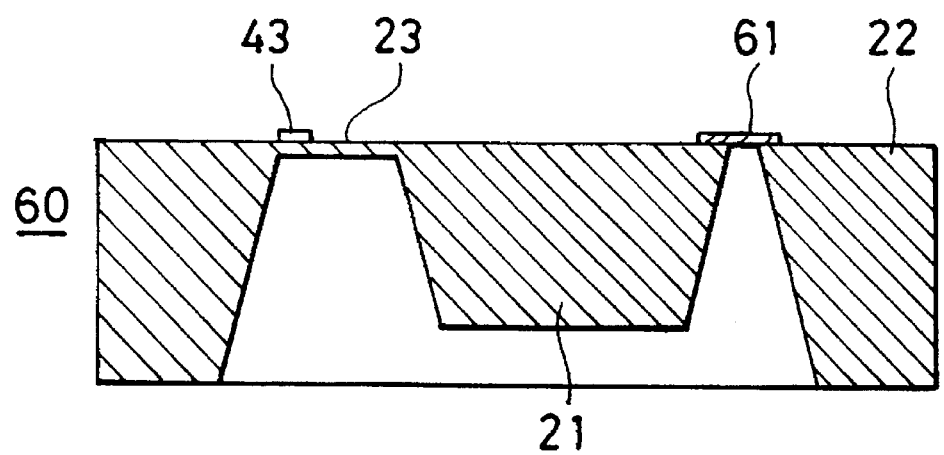
FIG. 8B is a cross-sectional view taken along the line A—A in FIG. 8A.

FIGS. 8A and 8B illustrate a second embodiment of a micromachine in accordance with the invention, in which the micromachine is applied to an acceleration sensor similarly to the first embodiment. In FIGS. 8A and 8B, parts that correspond to those of the first embodiment illustrated in FIGS. 2A and 2B have been provided with the same reference numerals as FIGS. 2A and 2B.

An acceleration sensor 60 of the second embodiment is characterized by that a support member 61 is formed of material having a lower melting point than a melting point of material of which the movable portion 21, the unmovable portion 22 and the connecting portion 23 are formed.

The second embodiment can be applied to an acceleration sensor when the support member 61 cannot have a higher resistance than the movable portion 21 and the unmovable portion 22 because the portions 21 and 22 have quite a high resistance, or when an element constituting the sensor 60 is damaged by applying an electrical current to the movable portion 21.

The movable portion 21 and the unmovable portion 22 are formed by partially scooping out a bottom surface of a silicon substrate having a low density. The connecting portion 23 is formed at an upper surface of the silicon substrate by. applying a plastic adhesive having a low melting point over a space formed between the movable portion 21 and the unmovable portion 22. Then, a desired pattern of wirings and/or circuit elements are arranged on an upper surfaces of the movable portion 21 and/or the unmovable portion 22. Finally, the acceleration sensor 60 is entirely heated in an oven, and thus only the support member 61 can be melted down or cut off, since the support member 61 has a lower melting point than others.

Figure 9A:
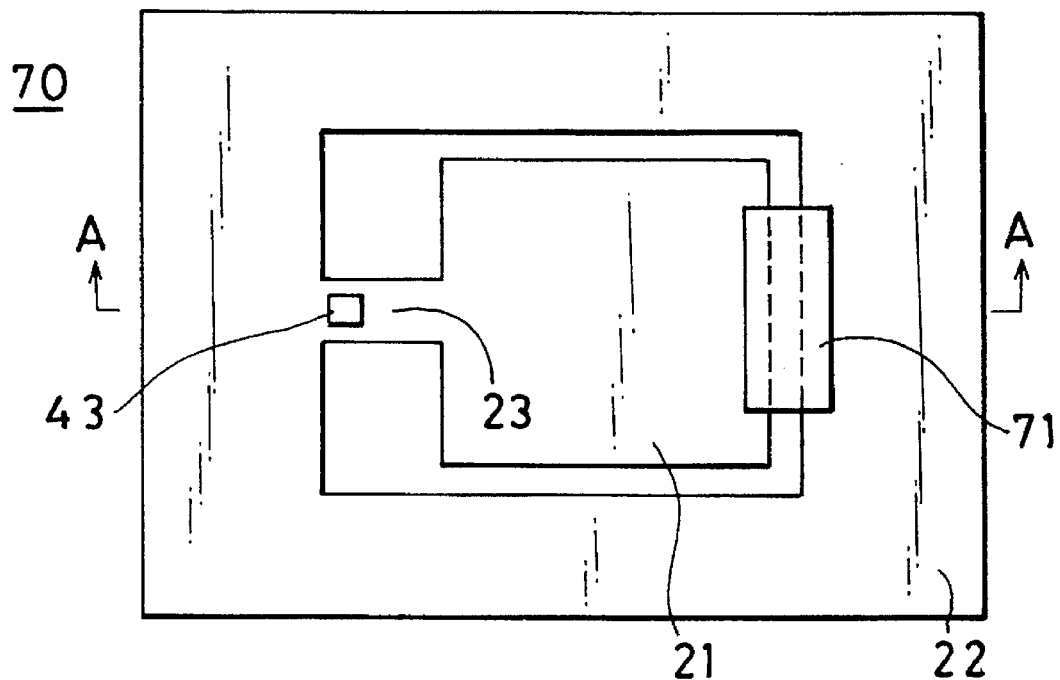
FIG. 9A is a top plan view illustrating a third embodiment in accordance with the invention.
Figure 9B:
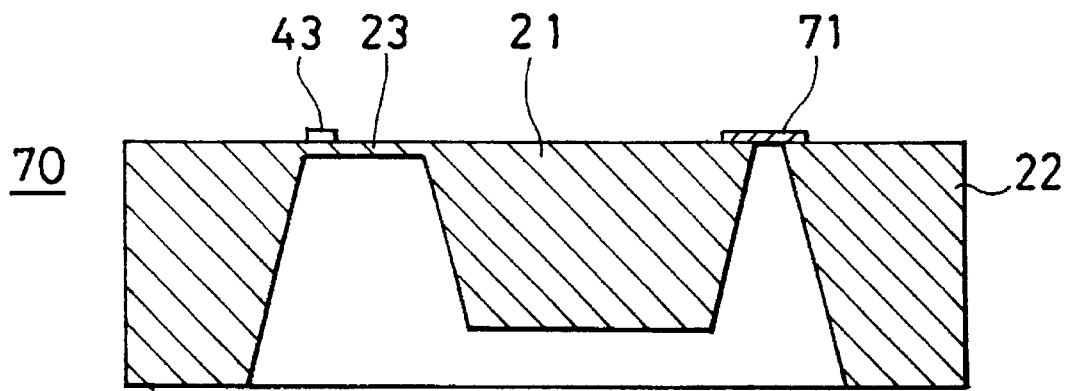
FIG. 9B is a cross-sectional view taken along the line A—A in FIG. 9A.

FIGS. 9A and 9B illustrate a third embodiment of a micromachine in accordance with the invention, in which the micromachine is applied to an acceleration sensor similarly to the first and second embodiments. In FIGS. 9A and 9B, parts that correspond to those of the first embodiment illustrated in FIGS. 2A and 2B have been provided with the same reference numerals as FIGS. 2A and 2B.

An acceleration sensor 70 in accordance with the third embodiment is characterized by that a support member 71 is formed as a thin film made of material having a characteristic frequency different from that of the movable portion 21, the unmovable portion 22 and the connecting portion 23.

After packaging the acceleration sensor 70 in a package, the same characteristic frequency as that of the thin film 71 is entirely applied to the acceleration sensor 70 to thereby enable to cut off only the thin film 70, giving no damage to others.

The third embodiment can be applied to an acceleration sensor when an element constituting the sensor 70 is damaged by applying an electrical current or heat thereto.

The support member or thin film 71 is preferably made of carbon, if the movable portion 21, the unmovable portion 22 and the connecting portion 23 are all made of silicon.

The thin film 71 can be processed at the same time as other steps during a process for fabricating a micromachine. It is preferable for simplifying the micromachine fabricating process, to select a material of which the thin film 71 is made so that the material can commonly be used in other steps.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A micromachine comprising:

a movable portion;

an unmovable portion surrounding said movable portion;

a connecting portion which connects said movable portion with said unmovable portion in a cantilever fashion; and a support member which connects said movable portion with said unmovable portion at a location other than a location at which said movable portion is connected with said unmovable portion through said connecting portion, said support member being formed of weaker material than material of which all of said portions are formed, with respect to any one of a number of physical properties shared by all of said portions, whereby said support member is adapted to be cut off by applying energy effective to said any one of properties thereto after said micromachine has been packaged.

2. A micromachine in accordance with claim 1 wherein said micromachine comprises an acceleration sensor.

3. A micromachine comprising:

a movable portion;

an unmovable portion surrounding said movable portion;

a connecting portion which connects said movable portion with said unmovable portion in a cantilever fashion; and a support member which connects said movable portion with said unmovable portion at a location other than a location at which said movable portion is connected with said unmovable portion through said connecting portion, said support member being formed of thermally fusible material, said material generating heat therein when an electrical current is applied thereto due to a resistance thereof, whereby said support member is cut off by applying an electrical current thereto.

4. A micromachine in accordance with claim 3 wherein at least said connecting portion among all of said portions comprises electrically conductive diffusion layer formed by injecting impurities thereinto.

5. A micromachine in accordance with claim 3 wherein all of said portions are provided with metal wirings formed by means of a metal deposition process.

6. A micromachine in accordance with claim 3 wherein all of said portions comprise an electrically conductive diffusion layer formed by injecting impurities thereinto or are provided with metal wirings formed by means of metal deposition process in dependence on the order of steps involved in a process for fabricating said micromachine.

7. A micromachine comprising:

a movable portion;

an unmovable portion surrounding said movable portion;

a connecting portion for connecting said movable portion with said unmovable portion in a cantilever fashion; and a support member for connecting said movable portion with said unmovable portion at a location other than a location at which said movable portion is connected with said unmovable portion through said connecting portion, said support member being formed of material having a lower melting point than a melting point of material of which all of said portions are formed, whereby said support member is cut off by applying heat thereto.

8. A micromachine in accordance with claim 7 wherein all of said portions are made of silicon, and said support member comprises plastic adhesive.

9. A micromachine comprising:

a movable portion;

an unmovable portion surrounding said movable portion;

a connecting portion which connects said movable portion with said unmovable portion in a cantilever fashion; and a support member which connects said movable portion with said unmovable portion at a location other than a location at which said movable portion is connected with said unmovable portion through said connecting portion, said support member having a characteristic frequency different from that of all of said portions, whereby said support member is cut off by applying said characteristic frequency of said support member thereto.

10. A micromachine in accordance with claim 9 wherein all of said portions are made of silicon, and said support member is made of carbon.

* * * * *